United States Patent [19]

Skeels

[11] Patent Number: 5,219,244
[45] Date of Patent: Jun. 15, 1993

[54] SUBSEA PIPELINE PIG LAUNCHING SYSTEM

[75] Inventor: Harold B. Skeels, Kingwood, Tex.

[73] Assignee: FMC Corporation, Chicago, Ill.

[21] Appl. No.: 654,717

[22] Filed: Feb. 13, 1991

[51] Int. Cl.⁵ .......................... F16L 1/00; B08B 1/00
[52] U.S. Cl. ................................. 405/158; 405/154; 15/104.062
[58] Field of Search ............... 405/154, 156, 158, 165, 405/169, 170; 15/104.061, 104.062, 104.063

[56] References Cited

U.S. PATENT DOCUMENTS

| | | |
|---|---|---|
| 3,266,076 | 8/1966 | Surber . |
| 3,562,014 | 2/1971 | Childers et al. . |
| 3,883,431 | 5/1975 | Ishii et al. ................ 15/104.062 X |
| 3,908,682 | 9/1975 | Thompson ................ 15/104.061 X |
| 4,016,621 | 4/1977 | Slegers et al. ............. 15/104.062 |
| 4,132,243 | 1/1979 | Kuus ......................... 15/104.062 X |
| 4,275,475 | 6/1981 | Schwartz et al. ......... 15/104.061 |
| 4,281,432 | 8/1981 | Saxon ........................ 15/104.061 |
| 4,332,277 | 6/1982 | Adkins et al. ............. 405/170 X |
| 4,390,043 | 6/1983 | Ward ......................... 405/170 X |
| 4,401,133 | 8/1983 | Lankston .................. 15/104.062 X |
| 4,457,037 | 7/1984 | Rylander .................. 15/104.062 |
| 4,574,830 | 3/1986 | Rickey et al. . |
| 4,643,248 | 2/1987 | Voith et al. .............. 15/104.061 X |
| 4,653,134 | 3/1987 | Ando ......................... 15/104.061 X |
| 4,716,611 | 1/1988 | Barry ......................... 15/104.062 X |
| 4,726,089 | 2/1988 | Knapp ....................... 15/104.061 |
| 4,941,511 | 7/1990 | Johansen et al. .......... 405/170 X |
| 4,984,322 | 1/1991 | Cho et al. .................. 15/104.061 |
| 5,035,021 | 7/1991 | Le Devehat ............... 15/104.061 |

Primary Examiner—Randolph A. Reese
Assistant Examiner—J. Russell McBee
Attorney, Agent, or Firm—W. W. Ritt, Jr.; Lawrence Cruz; Richard B. Megley

[57] ABSTRACT

Apparatus and method for easily installing and effectively launching pipeline pigs into a subsea or other underwater pipeline accessible to a diver.

14 Claims, 2 Drawing Sheets

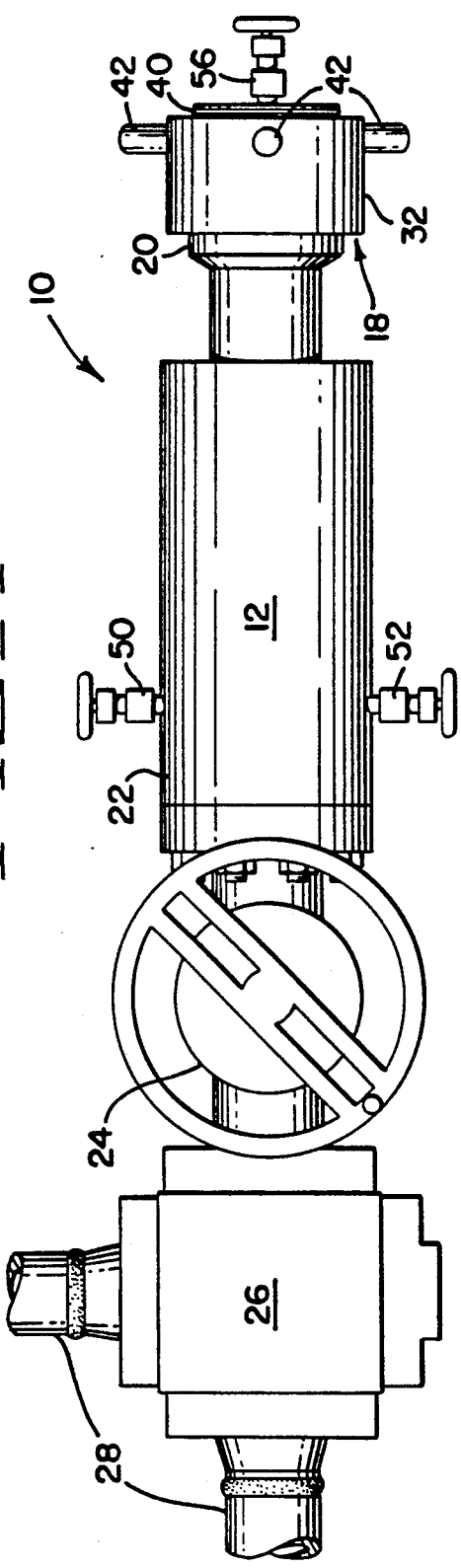
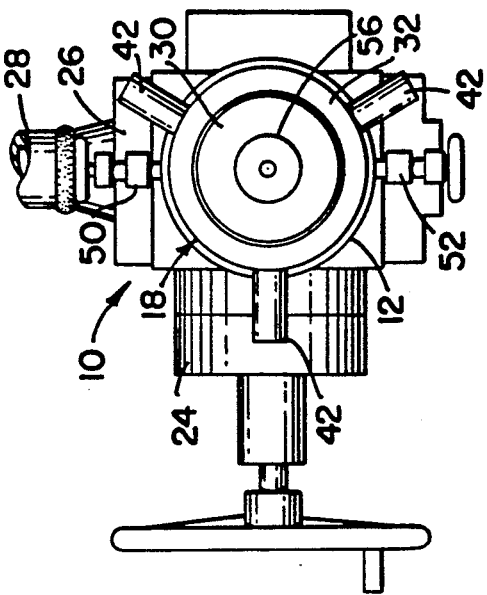
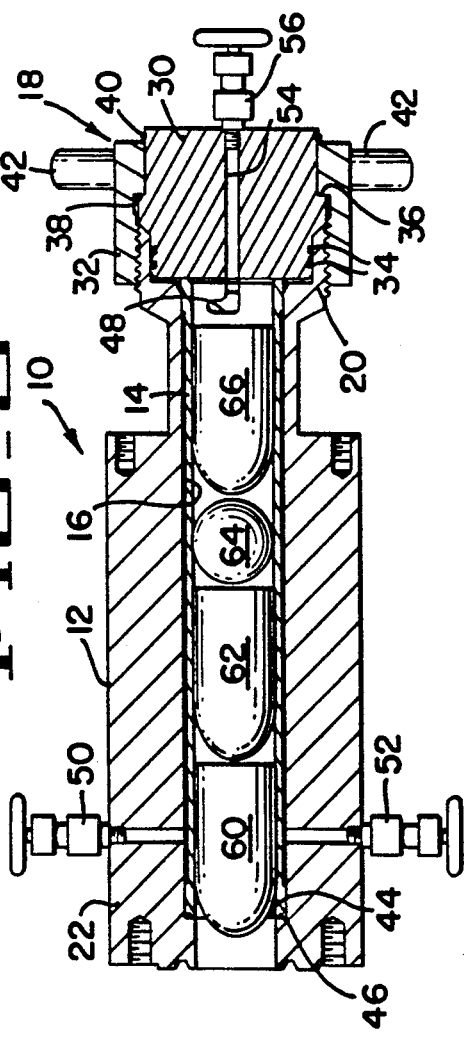

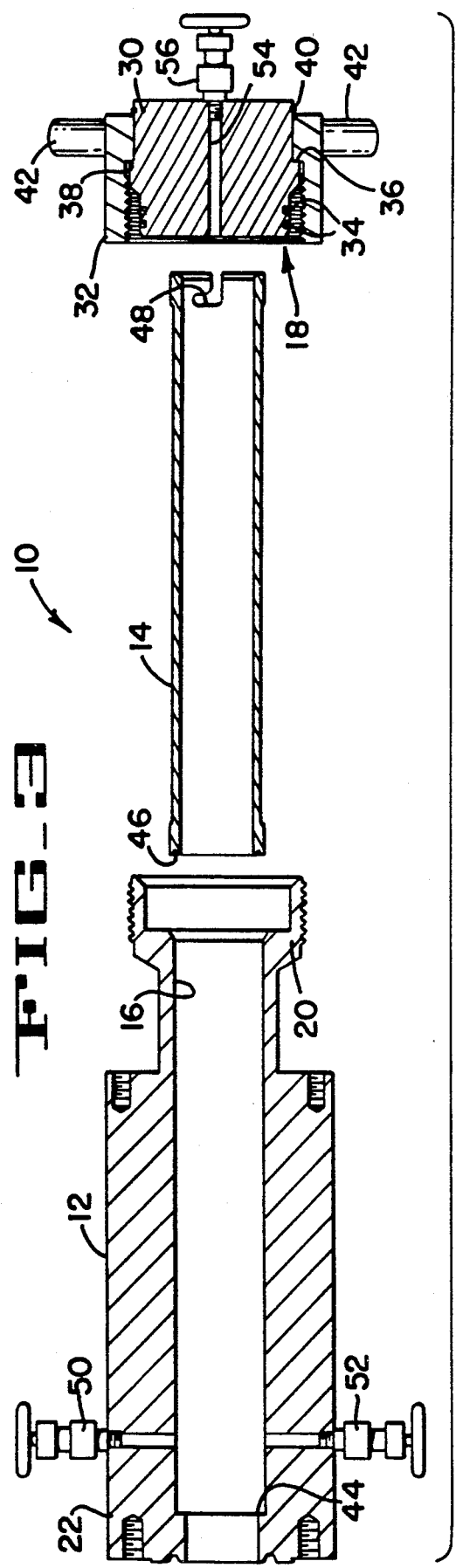
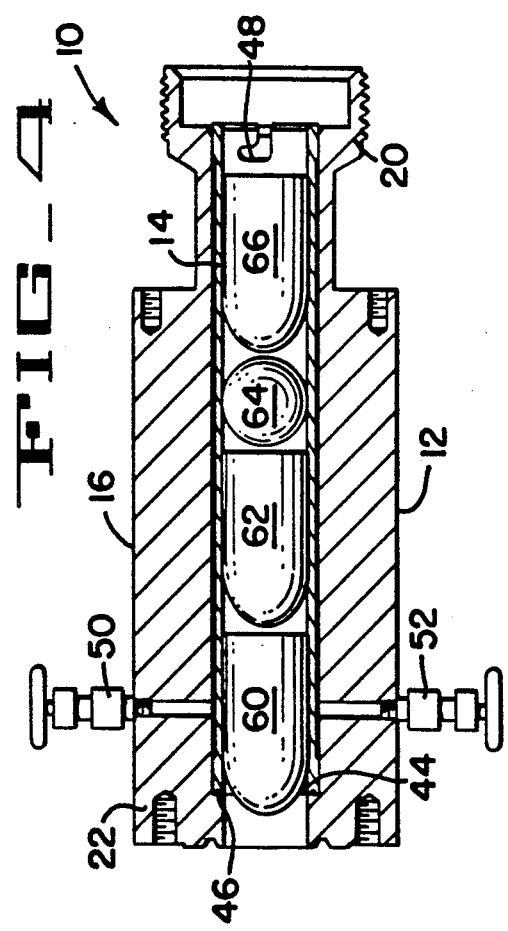

SUBSEA PIPELINE PIG LAUNCHING SYSTEM

BACKGROUND OF THE INVENTION

This invention relates to pipeline pig launching systems, and more particularly to diver assisted systems for launching pigs into subsea pipelines.

In the oil and gas industry a common procedure for removing petroleum deposits and other debris from pipelines is to push a scraper, referred to as a "pig", through the lines by fluid pressure. The pig is introduced into the pipeline from a launching system generally comprising a housing for the pig, a pipe reducing nipple, a launching valve, and a source of fluid pressure connected to the housing behind the pig. The diameter of the pig prior to launching is greater than that of the pipeline so that considerable force is required to seat the pig against, and move it through, the reducing nipple. It is at this point where conventional pig launching systems fail unless the pig is loaded properly so that it seals against the pipe wall near the reduced neck portion of the reducing nipple. Some physical or mechanically assisted effort on the part of the operator is often required to compress the pig to achieve a proper seal, thereby frequently presenting a problem that is compounded underwater where a diver may not have the strength or mobility to properly install the pig.

SUMMARY OF THE INVENTION

The present invention comprises an apparatus and method for easily installing and effectively launching pipeline pigs into a subsea or other underwater pipeline accessible to a diver. The apparatus includes a launch barrel with a bore for accepting a cartridge containing one or more pigs, a sleeve-like pig cartridge for insertion into the barrel bore and with an inside diameter the same as the diameter of the pipeline to be "pigged", a launch valve for interconnecting the downstream end of the launch barrel to a pipeline element, a quickly and easily installable and removable end cap and retainer ring assembly for the upstream end of the launch barrel, and a plurality of fluid pressure control valves to facilitate diver control of the pressurized environment inside the launch barrel so that a diver can install a pig-containing cartridge and then inject inert gas to re-pressurize and propel the pig down the pipeline.

The pig cartridge is sized in length to accept a plurality of different types of pigs, preferably three or more, in the order desired to clean the pipeline. The pigs are compressed and loaded into the cartridge at a surface facility so that the diver does not have to worry about the order in which he would otherwise have to install the pigs in the launcher, or whether the pigs have been installed properly. The cartridge preferably includes an annular face seal element, such as an O-ring, on its downstream end that is pressed against a radial surface or shoulder near the downstream end of the launch barrel when the end cap is tightened, so that when pressurized inert gas is applied to propel the pig(s) the gas will not bypass the cartridge and pigs. This face seal and the inside diameter of the cartridge eliminate the need for a pipe reducing nipple, thereby lessening the overall length of the launching system to provide an advantage over conventional systems especially where space on the subsea well tree frame is very restricted.

The cartridge also includes J-slots in its upstream end that readily accept a tool for retrieving an empty cartridge from the launch barrel. The J-slots extend entirely through the wall of the cartridge and thus also serve as a vent to equalize pressure on both sides of the cartridge during venting or repressurizing operations.

The pig launch valve is similar to a well Christmas tree swab valve in that when closed it isolates the launches from the fluid in the pipeline and acts as the main pressure barrier while a pig cartridge is being installed in the launch barrel.

BRIEF DESCRIPTION OF THE DRAWINGS

FIG. 1 is a side elevation of a subsea pig launching system according to the present invention, showing the system connected to a pipe tee in a subsea pipeline.

FIG. 2 is an upstream end elevation of the launching system of FIG. 1.

FIG. 3 is an exploded view in central vertical section of the launching system of FIGS. 1 and 2.

FIG. 4 is a view in central vertical section of the launching barrel and pig cartridge of FIG. 3 in assembled position, and with four pigs loaded in the cartridge.

FIG. 5 is a view like FIG. 4, but showing the end cap assembly in place on the launch barrel and the system ready for a launching operation.

DESCRIPTION OF THE PREFERRED EMBODIMENT

As seen in FIGS. 1-3, a subsea pig launching system 10 according to the present invention broadly comprises a tubular launch barrel 12, a pig cartridge 14 for insertion into the barrel bore 16, and an end cap assembly 18 that functions as a removable closure component for the upstream end 20 of the barrel 12. The downstream end 22 of the launch barrel 12 is adapted to be secured to a launch valve 24 that interconnects the launching system 10 to a pipeline, such as a pipe tee 26 in a subsea pipeline 28.

The end cap assembly 18 comprises a central barrel closure element 30 that fits into the upstream end 20 of the barrel 12, and a retainer ring 32 that surrounds the closure element 30 and threads onto the barrel's upstream end 20. The closure element 30 includes one or more (two shown) annular seal elements 34 that seal the element 30 to the launch barrel 12 in a pressure-tight manner when the end cap assembly 18 is properly installed, and an outer annular shoulder 36 that cooperates with an inner annular shoulder 38 on the retainer ring 32 to retain the closure element in sealed position in the barrel. A snap ring 40 in an annular groove on the outer surface of the closure element 30 holds the retainer ring 32 on the element 30, and radial extending lugs 42 on the ring 32 provide a means to rotate the ring for threading it onto, and unthreading it from, the launch barrel 12.

The pig cartridge 14 has an internal diameter that is the same as the diameter of the pipeline 28, and an outside diameter that between its upstream and downstream end portions is slightly less than the outside diameter of those end portions, as shown in FIGS. 3, 4 and 5. The cartridge 14 is sized lengthwise to extend from the barrel closure element 20 to an annular radial shoulder 44 near the downstream end of the barrel bore 16, and an O-ring or other suitable annular seal element 46 in the downstream end face of the cartridge 14 provides a pressure-tight seal between the cartridge and the barrel shoulder 44. The cartridge 14 also includes a pair of J-slots 48 (only one shown) in its upstream end to provide a means for withdrawing the cartridge from the launch barrel 12 with a suitable tool (not shown). The J-slots extend completely through the wall of the cartridge 14 to further function as vents for equalizing the pressure on both sides of the cartridge during installation and removal operations.

The launch barrel 12 includes a vent valve 50 and a drain valve 52, both valves preferably of the needle type, for venting the barrel bore 16 to the sea water atmosphere. The barrel closure element 30 has an axial fluid pressure passageway 54 and a pressure inlet valve 56 for use in pressurizing the barrel 12 during the pig launching procedure. The valve 56 has suitable means (not shown) for quickly and easily attaching a pressure hose to it when preparing for the barrel pressurizing step of that procedure.

PIG LAUNCHING OPERATION

The following steps are involved in using the above-described pig launching system to launch one or more pigs into a subsea pipeline from a subsea Christmas tree location.

1) The selected pipeline pig(s), such as 60, 62, 64, 66 (FIGS. 4 and 5) are properly oriented and then pressed into the pig cartridge 14 at a surface facility, such as a ship from which the diver operations are carried out.
2) A diver descends to the subsea tree-located launch barrel with the loaded pig cartridge 14 and a cartridge removal tool.
3) The diver makes sure that the launch valve 24 is closed, and then opens both vent and drain valves 50, 52 on the launch barrel 12, flooding the barrel to ambient seawater pressure.
4) The diver then unscrews and removes the end cap assembly 18 and, if an empty pig cartridge is inside, engages that cartridge's J-slots with the removal tool and pulls the cartridge out of the launch barrel.
5) The diver then inserts the loaded pig cartridge into the launch barrel, downstream (O-ring) end first, and replaces the end cap assembly 18 on the barrel. As the retainer ring 32 is tightened the closure element 30 forces the cartridge against the barrel bore shoulder 44, making up the face seal between that shoulder and the cartridge.
6) The diver then attaches a fluid pressure hose (connected to a pressurized inert gas supply) to the inlet valve 56 on the closure element 30, closes the barrel vent valve 50 and then, leaving the barrel drain valve 52 open, opens the inlet valve 56 to admit gas to the barrel bore 16 and purge water therefrom.
7) When gas bubbles emerge from the drain valve 52, the diver closes both that valve and the pressure inlet valve 56.
8) The diver then cracks open the pig launch valve 24 to equalize pressure in the launch barrel 12 and the pipeline 28, and then fully opens the launch valve and pressure inlet valve 56.
9) If a pig signal mechanism (not shown) is present in the pipeline the diver resets it, and gas pressure is conducted through the supply hose (not shown) and into the launch barrel 12 to propel the pigs 60–66 out of the launching system and into the pipeline 28.
10) When all the pigs are in the pipeline, as will be indicated by the signal mechanism, the inert gas supply is turned off, the diver closes the pig launch valve 24 and the inlet valve 56, and then removes the supply hose. When the well is brought back on stream, wellbore pressure will propel the pig(s) the rest of the way through the pipeline 28 to the pig retrieval location (not shown).

As will be apparent from the foregoing description, the present invention provides a pig launching system with several advantages over other systems for that purpose, including greatly enhanced ease of pig installation, a guarantee that pig(s) is (are) oriented properly, a guarantee that a plurality of pigs are in the desired and proper order for launching into and travel through the pipeline, and elimination of a need to include a pipe reducer between the launcher and the pipeline.

Although the best mode contemplated for carrying out the present invention has been herein shown and described, it will be apparent that modification and variation may be made without departing from what is regarded to be the subject matter of the invention.

What is claimed is:

1. A pipeline pig launching system especially useful for launching at least one pig into a pipeline at a subsea location, the system comprising:
   (a) a tubular pig launch barrel having an upstream end, a downstream end, a bore extending between said ends, and means to connect the downstream end to a pig launch valve;
   (b) a tubular pig cartridge for loading with at least one pipeline pig in a press-fitted manner, said cartridge having an upstream end having a first outside diameter, a downstream end having a second outside diameter, a wall defining a bore of uniform inside diameter substantially the same as the diameter of the pipeline with which the system is employed, and means at said downstream end of said cartridge to seal said cartridge to the launch barrel, wherein said cartridge has a wall between its upstream and downstream ends with an outside diameter slightly less than said first and second outside diameters of said ends of said cartridge;
   (c) means for closing the upstream end of the launch barrel while the cartridge is in proper position in the barrel bore; and
   (d) means for inletting fluid pressure into the launch barrel bore for impelling a pipeline pig from the cartridge and through a launch valve into a pipeline to which the system is connected.

2. A pig launching system according to claim 1 wherein the means for closing the upstream end of the launch barrel comprises an end cap with means to releasably secure it to the launch barrel.

3. A pig launching system according to claim 2 wherein the end cap is an assembly including a barrel closure element and a retainer ring for said element.

4. A pig launching system according to claim 3 wherein the closure element includes means to seal said element to the launch barrel.

5. A pig launching system according to claim 3 wherein the retainer ring and the launch barrel have complementary threads for securing the ring to the barrel.

6. A pig launching system according to claim 2 wherein the means for inletting fluid pressure into the barrel bore comprises a fluid passageway through the end cap, valve means for controlling flow through said passageway, and means for releasably attaching a fluid pressure supply hose to said valve means.

7. A pig launching system according to claim 1 wherein the pig cartridge is pressed into fluid-tight engagement with the launch barrel as the means for closing the upstream end of the barrel is being installed.

8. A pig launching system according to claim 1 wherein the means for sealing the downstream end of the cartridge to the launch barrel comprises an annular radial shoulder in the barrel bore and an annular sealing element between said shoulder and the end face of the cartridge.

9. A pig launching system according to claim 1 including valve means to vent the launch barrel bore.

10. A pig launching system according to claim 1 including valve means to drain fluid from the launch barrel.

11. A pig launching system according to claim 1 wherein the cartridge includes means at its upstream end area to facilitate removing said cartridge from the launch barrel.

12. A pig launching system according to claim 11 wherein the means to facilitate removing said cartridge comprises J-slots in the cartridge wall.

13. A pig launching system according to claim 12 wherein the J-slots extend through the cartridge wall and additionally function as vents to equalize the pressure on both sides of said wall.

14. A pig launching system according to claim 1 wherein the cartridge has an axial length sufficient to accommodate a plurality of pipeline pigs.

* * * * *